United States Patent [19]

Mihic

[11] 4,453,704
[45] Jun. 12, 1984

[54] APPARATUS FOR RETAINING BLANKS IN WORKING MACHINES

[76] Inventor: Wlajko Mihic, Tegnérvägen 9, S-802 28 Gävle, Sweden

[21] Appl. No.: 197,801
[22] PCT Filed: Oct. 23, 1979
[86] PCT No.: PCT/SE79/00217
  § 371 Date: Jun. 24, 1980
  § 102(e) Date: Jun. 16, 1980
[87] PCT Pub. No.: WO80/00809
  PCT Pub. Date: May 1, 1980

[30] Foreign Application Priority Data

Oct. 24, 1978 [SE] Sweden .............................. 7811063

[51] Int. Cl.³ .............................................. B23Q 3/06
[52] U.S. Cl. .................................... 269/8; 51/217 P;
  269/43; 269/246; 279/1 M; 409/903
[58] Field of Search ............... 409/903, 226, 82, 138;
  279/1 M; 269/8, 43, 246, 249, 287; 51/217 R,
  217 P

[56] References Cited

U.S. PATENT DOCUMENTS

| | | | |
|---|---|---|---|
| 220,875 | 10/1879 | Shepperd | 269/249 |
| 651,908 | 6/1900 | Walker | 409/903 X |
| 1,377,118 | 5/1921 | Eaton | 51/217 R |
| 1,394,392 | 10/1921 | Zavagno . | |
| 1,471,624 | 10/1923 | Morton | 409/903 X |
| 1,499,575 | 7/1924 | Glaudel | 409/903 X |
| 1,823,537 | 9/1931 | Gaudreau | 51/217 R |
| 1,985,817 | 12/1934 | Celinski | 51/217 R X |
| 2,354,970 | 8/1944 | Volkel | 51/217 P |
| 2,826,125 | 3/1958 | Dougherty | 269/287 X |
| 3,262,232 | 7/1966 | Hilbrunner | 51/217 |

FOREIGN PATENT DOCUMENTS 195771 3/1907 Fed. Rep. of Germany .

Primary Examiner—Z. R. Bilinsky
Attorney, Agent, or Firm—Brumbaugh, Graves, Donohue & Raymond

[57] ABSTRACT

According to the present invention a plurality of blanks (2) to be surface machined in working machines are placed side by side and fixed in a frame (1), open at both sides, in such a way that the blanks (2) can be machined at least at two sides while the fixation of the blanks (2) in the frame (1) is maintained. The blanks (2) are fixed tensionless in the frame (1) in such a position where the blanks bear against the frame sides on which the machining forces work during machining. The frame (1) with the blanks (2) fixed therein is first kept clamped with one side (4) resting against a machine support (6), while the portions (17) of the blanks (2) at the opposite side (5) are machined. After that the frame (1) is turned in such a way that the blanks (2) with its machine portions (17) rest against a support (6) consisting of a plane magnet plate, whereupon the blanks (2) are machined on the side (18) facing away from said support (6).

The frame (1) for carrying out the method is formed at one side (4) in such a way that the blanks (2) fixed therein are available for machining from said side (4) although they are to be situated inwardly of the plane of the side (4), since this plane is to be kept fixed against a plane support during working of the fixed blanks (2) from the opposite side (5) of the frame (1) outside the plane of which side (5) the blanks (2) are intended to reach.

4 Claims, 15 Drawing Figures

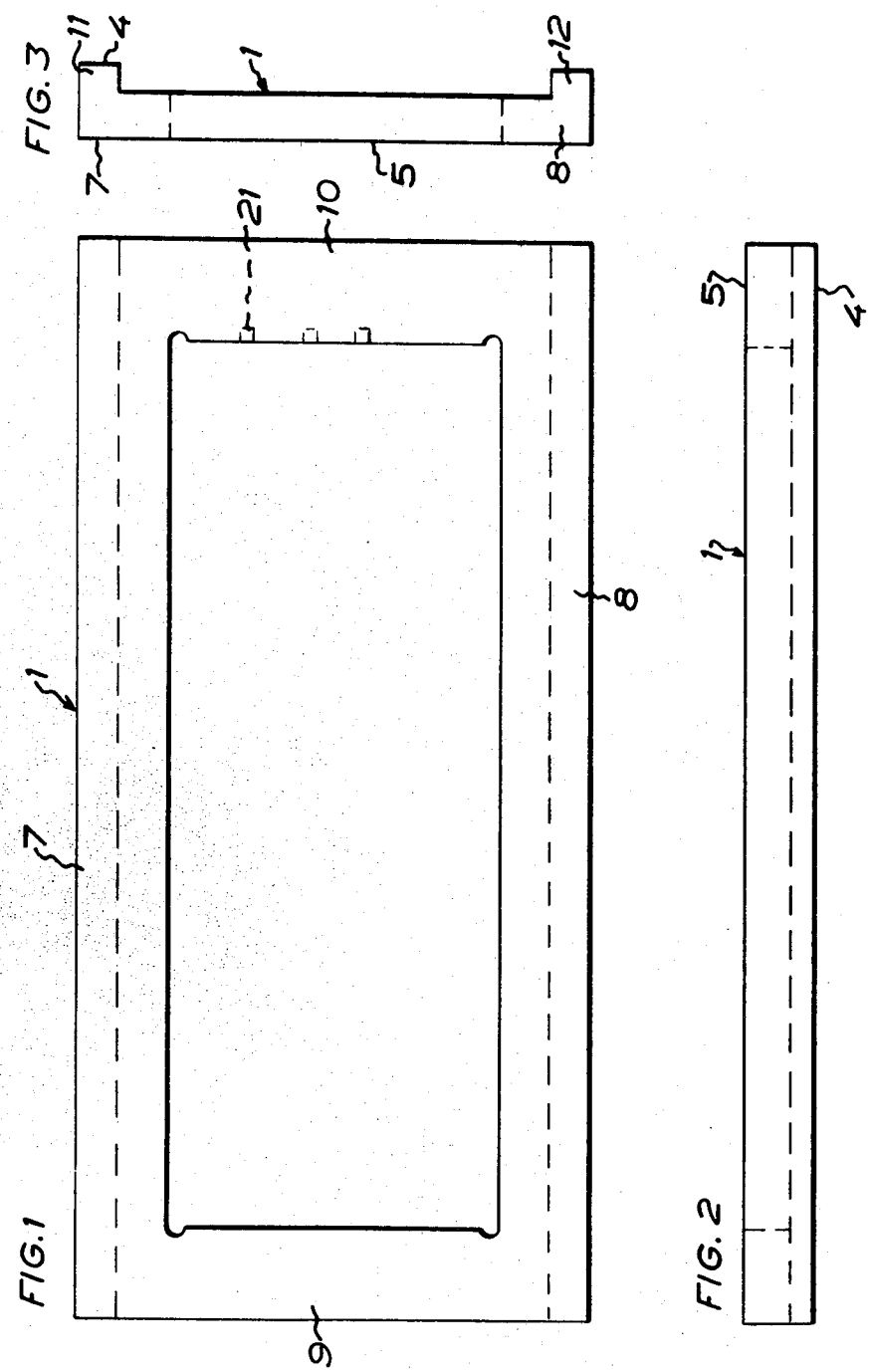

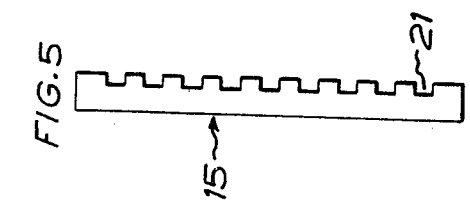
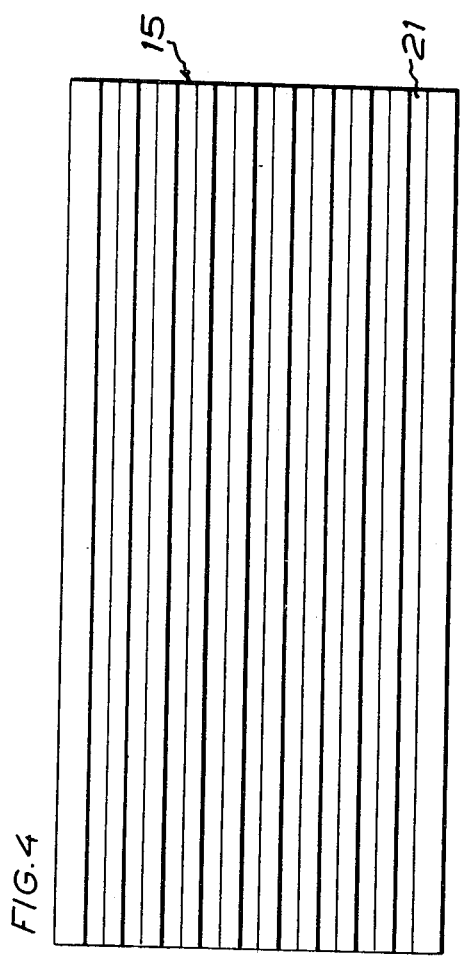
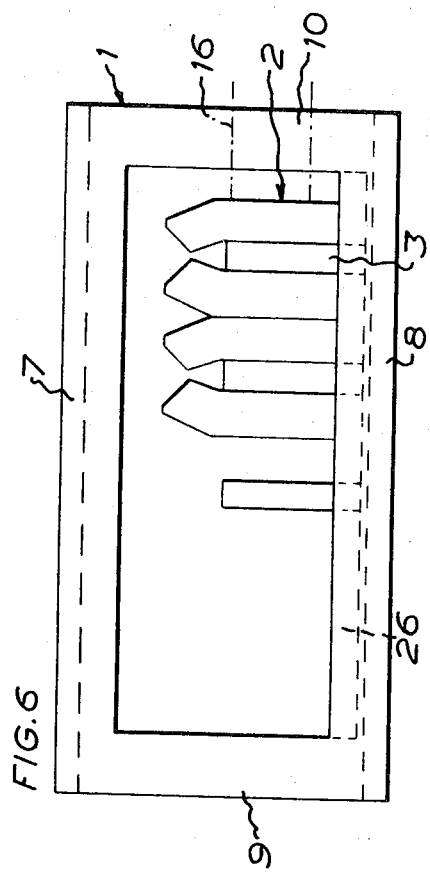

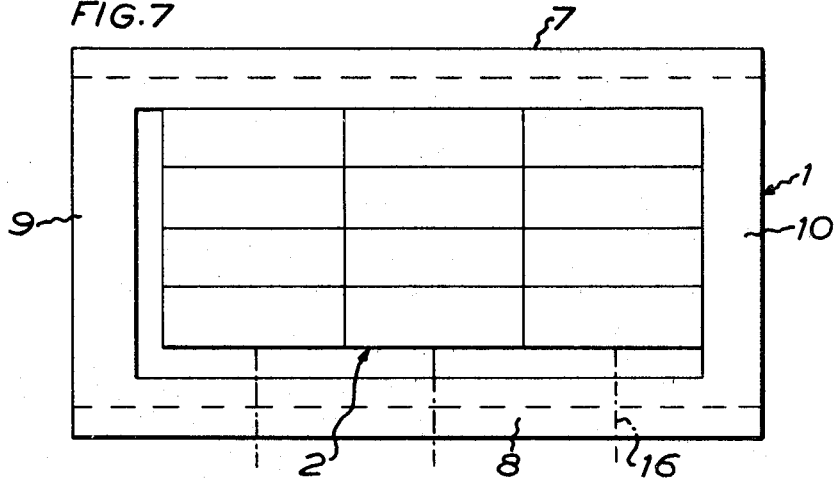
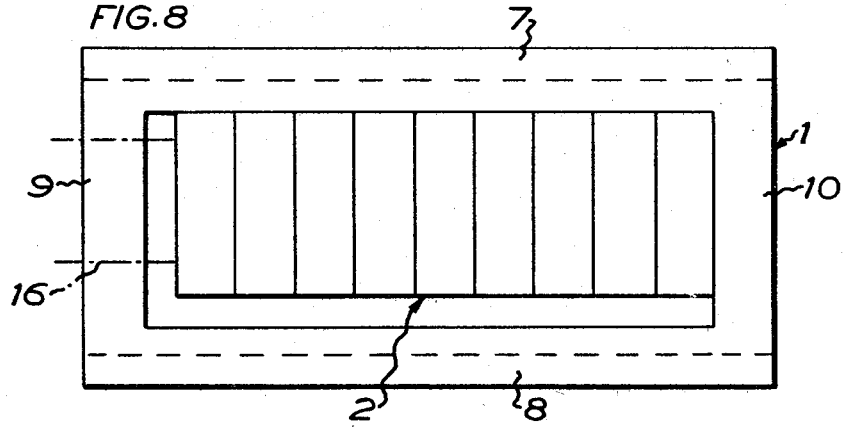
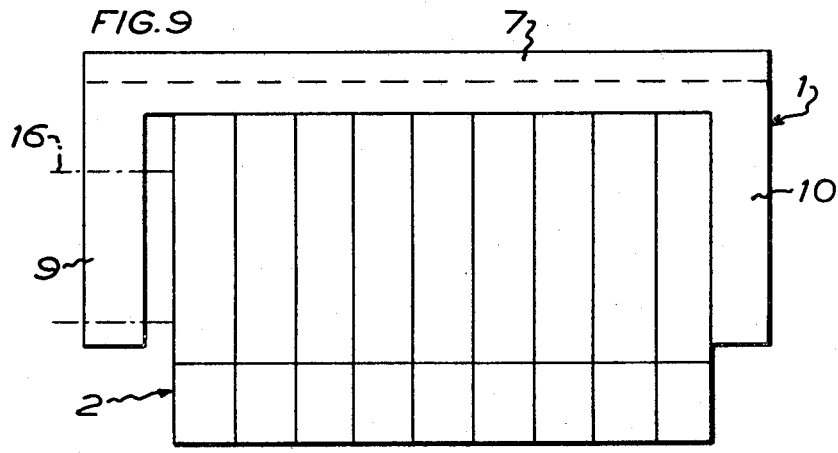

APPARATUS FOR RETAINING BLANKS IN WORKING MACHINES

The present invention relates to a method of surface machining blanks into shanks for carbide tips or the like in working machines, such as mill cutters, in which method a plurality of blanks are placed side by side and fixed with or without shims therebetween, in a frame open at both sides, and in which method the frame is clamped in various positions relative to the machining tools of the working machines for processing the blanks therein so that machining of the blanks is effected at least at two of the sides thereof while the fixation of the blanks in the frame is maintained. Characteristic of the method is that the blanks are fixed in a substantially tensionless manner in the frame in such a position, where the blanks bear against the frame sides on which the machining forces work during machining, that the frame is first held clamped with one side resting against a machine support, while the portions of the blanks on the opposite side are machined, that the frame then is turned so that the blanks with their machined portions rest against a support consisting of a plane magnet plate, whereupon the blanks are machined on the side facing away from said support. Since the frame, with the blanks fixed without tension, is turned after the first machining operation so that the machined plane blank portions will be brought into plane engagement with the plane magnet plate, which secures safe retention of the blanks, it is possible to obtain a most exact working of the final shape of the shanks in the frame. Thus, the invention permits obtaining products of angular and dimensional accuracy at a reasonable cost.

The invention is also directed to an apparatus for retaining a plurality of blanks for shanks for carbide tips and the like in working machines such as mill cutters. The apparatus comprises a frame of preferably magnetic material, such as steel, in which the blanks are to be placed side by side and fixed. The frame is formed in such a way that the blanks can be machined from two sides without their fixation in the frame being changed. Characteristic of the apparatus is that the frame at one of its sides is so formed that the blanks fixed therein are available for machining from said side although they are intended to be situated inwardly of that plane of the side which is adapted to be kept fixed against a plane support during working of the fixed blanks from the opposite side of the frame outside the plane of which side the blanks are intended to reach.

The invention will be more fully described hereinafter with reference to the accompanying drawings which illustrate both the method and the apparatus and also some blanks adapted for machining and in which:

FIGS. 1-3 show by a way of example a frame in three directions at right angles to each other;

FIGS. 4 and 5 are respectively a top and an end view of a washer for the frame;

FIGS. 6-9 are top views of frames with blanks clamped therein;

Figure 10:
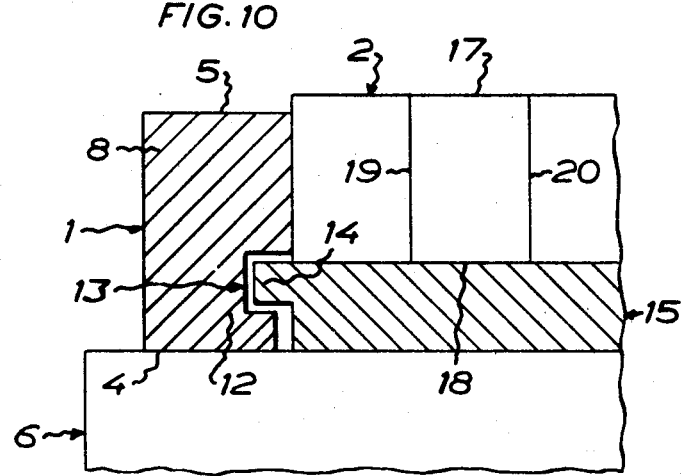
FIGS. 10 and 11 illustrate two successive machining moments with retained fixation of the blanks in the frame.
Figure 11:
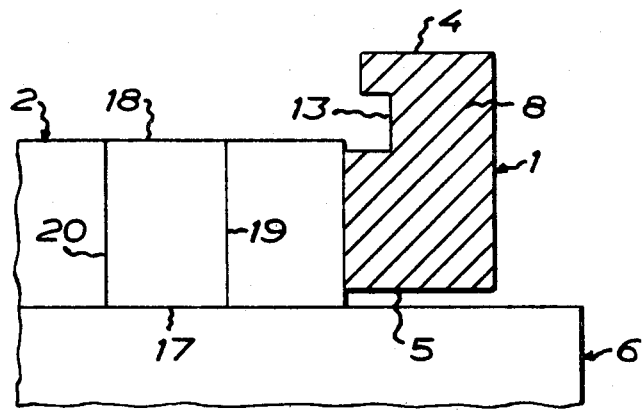

The apparatus of the invention consists of a frame 1 in which the blanks 2 are to be placed side by side and fixed with or without shims 3 therebetween. The frame 1 with the blanks 2 is, in turn, adapted to be clamped in various positions relative to the machining tools in various machines for processing the blanks 2 therein. Thus, machining of the blanks 2 can be effected at least at two of the sides thereof while the fixation of the blanks in the frame 1 is maintained. A rapid and economic production is obtained since the frame 1 allows simultaneous machining of a plurality of blanks 2 and the blanks 2 can maintain the same fixed position in the frame during two or more machining operations.

As appears from FIGS. 1-3 and FIGS. 10 and 11, the frame 1 is so formed at its side 4 that the blanks 2 fixed therein are available for machining from said side 4 although they are intended to be situated or recessed inwardly of the plane of the side 4, since said side plane 4 is to be kept fixed against a plane support 6 during working of the fixed blanks 2 from the opposite side 5 of the frame 1 outside the plane of which side 5 said blanks 2 are intended to reach.

The frame 1 is of rectangular shape. In most cases the frame 1 will include two pairs of opposed, parallel frame sides 7-10. In certain cases, however, the frame 1 must have one open frame side, as is apparent from FIG. 9. This will make it possible to machine the end portions of the blanks 2 at the open frame side.

The frame 1 of U-shaped cross-section, the width of the branches 11 and 12 being smaller than the width of the frame sides 7 and 8. As appears from FIGS. 10 and 11 the branches 11 and 12 may be provided with slots 13 on their inside for corresponding projections 14 at the edges of a washer 15. The slots 13 and the projections 14 are formed so that a play is provided therebetween.

The blanks 2 are fixed in the frame 1 in such a way that they will extend and reach outside the side 5 of the open frame 1, while they are recessed and spaced inside the side 4. First the blanks 2 are machined on the side corresponding to the side 5. To this end the frame side 4 should rest against the support 6 which preferably is a magnet plate. Thus the magnet plate 6 retains the plane frame 1, which of course implies that the frame consists of a magnetic material, such as steel. Alternatively the support 6 may be a plate having a number of sucking means which enter into function when an object rests against it. The support 6 may also consist of a common table for workpieces to which the frame 1 is clamped in the usual manner.

It is important that the blanks 2 should not be influenced by the magnetic force from the magnet plate 6 since this can produce tensions in the blanks 2 which are not entirely planar. The blanks 2 therefore are fixed in the frame 1 in such a way that there will be a gap between the blanks 2 and the magnet plate 6 when the frame 1 is clamped against it. The gap between the blanks 2 and the magnet plate 6 is filled out with a specific plate which consists of the washer 15 described above.

When the blanks 2 are placed in the frame 1 they are knocked down towards a plate corresponding to the washer 15 and fixed. The fixation should not take place with any considerable force and therefore the fastening means 16 may consist of screws which are tightened by hand. The fastening means 16 may likewise consist of hydraulic or pneumatic cylinder-piston means or the like with adjustable tensional force. Thus the blanks 2 are fixed in an at least substantially tensionless manner in the frame 1. The fixation, however, is such that the blanks 2 will be safely secured in position during machining. Thus the blanks 2 will bear, with or without their shims 3, against the frame sides on which the machining forces work during the machining operation.

When the blanks 2 are machined on the side 17 corresponding to the side 5, the frame 1 is turned so that the machined side 17 will rest against the support 6 of the working machine. The support can and should consist of a magnet plate 6 since the side 17 of the blanks resting against the support now is entirely planar. The blanks 2 can now be machined on the side 18 facing away from the support 6 so that the sides 17 and 18 become plane-parallel.

In case the blanks 2 are to assume parallelepipedic shape, the blanks turn through 90° in the frame so that the machined sides 17 and 18 will bear against each other. The other two sides 19 and 20 are now ready for machining in the frame 1 or in another frame. Considering the fact that burrs may arise during machining of the first sides 17 and 18, the frame 1, at least at one end, and the washer 15, at its upper side, are provided with grooves 21 placed where the transitions between the different blanks 2 can be expected to be situated.

Figure 12:
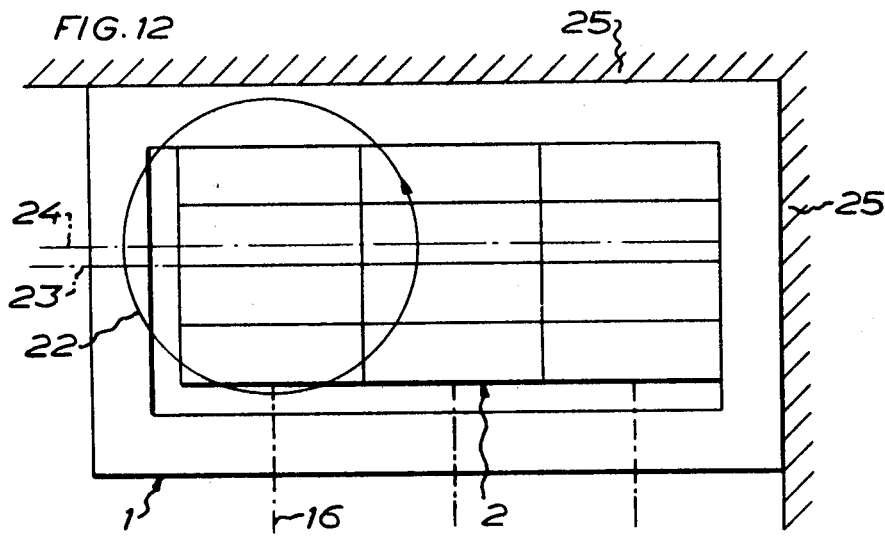
FIG. 12 illustrates machining of the blanks by means of an end face mill.

As indicated above, the fastening means 16 are not to be acted upon by any great force, because the machining of the blanks 2 in the frame 1 is carried out in such a way that it contributes to the retention, as shown in FIG. 12. The circle 22 represents the outer contour of an end face mill. The centre axis thereof is situated inside the centre line 23 for the blanks 2 in the frame 1. The centre axis moves along the line 24 to the right with respect to the figure and the mill cutter rotates anti-clockwise in the direction of the arrow. The blanks 2 and, consequently, the frame 1 are thus pressed against the stationary sides 25 against which it rests.

Figure 13:
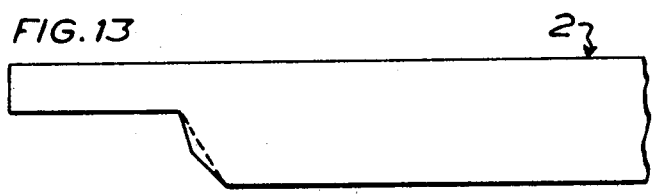
FIGS. 13-15 show three different blanks for shanks for carbide tips, which blanks can be machined in accordance with the present invention.
Figure 14:
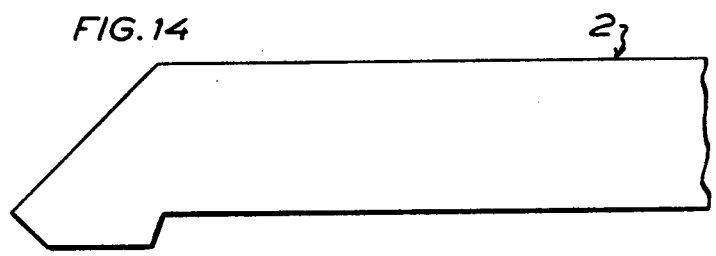
Figure 15:
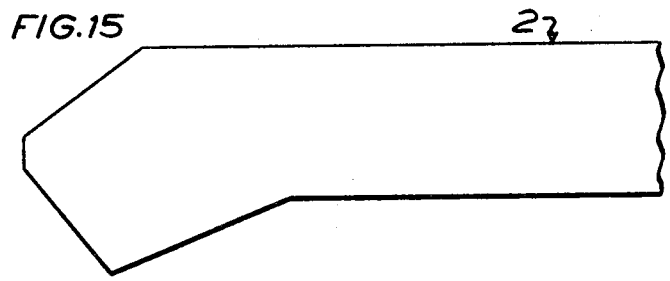

FIGS. 13-15 show some blanks 2 which can be surface machined in accordance with the invention. As many as six different surface machining operations can be carried out on these blanks with one and the same fixation. The blanks according to FIGS. 14 and 15 must be provided with shims 3 as they are placed in the frame 1 with the sides shown in the drawing being turned outwardly. The shims 3 may either be placed between each blank 2 or between every second blank 2 which should be opposed to each other, as is apparent from FIG. 6. The shims 3 are arranged in such a way that they are inside the outwardly turned sides of the blanks 2. The shims 3 may cooperate with a groove 26 in the frame side, which permits displacement of the shims 3 but prevents the shims 3 from inclining relative to the plane of the frame 1.

The present invention allows rational machining of large series of blanks 2. For this purpose use can be made of large or small frames 1. The various working moments are carried out in successively arranged working machines, and the frames 1 with the blanks 2 are transferred between the different machines on roller conveyors or like conveying means. However, the invention may also be used for small series, in which one and the same working machine may be used for several working moments. Also in this connection the frame 1 is of great importance.

The invention is not limited to that described above and shown in the drawings but may be modified within the scope of the appendant claims.

I claim:

1. Apparatus for retaining a plurality of elongated blanks for shanks for carbide tips and the like comprising:
   a frame having a top and a bottom and defining an opening extending from the top to the bottom to form at least one pair of opposed sides, said frame further having two branches extending upwardly from said frame along two of said opposed sides so that the end of the frame has a generally U-shaped configuration, the width of said branches being less than the width of the opposed sides from which they extend, said branches further defining slots along their inner side;
   a washer member having a top, a bottom, and projections at opposite sides which are adapted to be received in the slots of said branches, said projections being smaller than said slots to enable movement of the washer in said frame; and
   whereby elongated blanks can be fixedly placed in their longitudinal direction side by side inside the frame opening and be held therein, but can be accessible from both the top and bottom of the frame through the frame opening without reorienting the blanks from their held position, and wherein the blanks can be accessible from said frame bottom even when said blanks are recessed inwardly of the branch ends when the washer is not received in the slots, but wherein the washer fills the space between the recessed blanks and the end of the branch ends when the washer is received in the slots.

2. Apparatus for retaining as claimed in claim 1, wherein the frame has a generally rectangular shape with two pairs of opposed parallel frame sides.

3. Apparatus for retaining as claimed in claim 1, wherein the frame has a generally rectangular shape with only three coherent frame sides, two of which are opposed and parallel.

4. Apparatus for retaining as claimed in claim 1 wherein the frame is made of magnetic material.

* * * * *